United States Patent [19]

Mori et al.

[11] Patent Number: 4,997,177
[45] Date of Patent: Mar. 5, 1991

[54] METHOD OF AND APPARATUS FOR CONVEYING OBJECT BY UTILIZING VIBRATION

[75] Inventors: Kenji Mori, Tsuchiura; Hiromu Hirai, Tsukuba; Isao Kobayashi, Ibaraki; Tomoko Kumagae, Ibaraki; Muneo Kawamoto, Ibaraki, all of Japan

[73] Assignee: Hitachi, Ltd., Tokyo, Japan

[21] Appl. No.: 260,772

[22] Filed: Oct. 21, 1988

[30] Foreign Application Priority Data

Oct. 23, 1987 [JP] Japan ............................... 62-266388
Nov. 4, 1987 [JP] Japan ............................... 62-278587

[51] Int. Cl.⁵ ............................................. B65H 5/16
[52] U.S. Cl. .................................................. 271/267
[58] Field of Search ............................... 271/267, 266

[56] References Cited

U.S. PATENT DOCUMENTS

| 3,747,921 | 7/1973 | Knappe | 271/266 |
| 3,929,328 | 12/1975 | Knappe | 271/267 |
| 4,613,782 | 9/1986 | Mori . | |

FOREIGN PATENT DOCUMENTS

| 3129389 | 2/1983 | Fed. Rep. of Germany . |
| 51435 | 3/1986 | Japan . |
| 77071 | 4/1987 | Japan . |

OTHER PUBLICATIONS

IBM Technical Disclosure Bulletin, vol. 17, No. 2, pp. 501, 502, Jul. 1974, "Document Card Reader", Meyerhofer.

Primary Examiner—Richard A. Schacher
Attorney, Agent, or Firm—Antonelli, Terry, Stout & Kraus

[57] ABSTRACT

A vibrating-type driving unit employing a piezo-electric device is provided for conveying an object such as a sheet material. A follower roller is provided to be opposed to the vibrating-type driving unit, and A.C. power is supplied thereto so as to convey the object. In addition, a friction coefficient of surface of the follower roller is selected to be greater than friction coefficient of a driving head of the vibrating-type driving unit. With this selection, it is possible to convey the object efficiently and stably.

16 Claims, 11 Drawing Sheets

METHOD OF AND APPARATUS FOR CONVEYING OBJECT BY UTILIZING VIBRATION

BACKGROUND OF THE INVENTION

1. Field of the Invention

The present invention relates to a method of and an apparatus for conveying an object by utilizing vibration which is obtained when an A.C. voltage is applied to, for example, a piezoelectric device or an electrostrictive device.

2. Description of the Related Art

A known type of apparatus for driving a driven member by utilizing a piezoelectric device is disclosed in, for example, U.S. Pat. No. 4,613,782. This known type of apparatus is capable of generating a large driving force, and is therefore suitable for use in conveying a heavy object. However, the apparatus has the disadvantage that it is not suitable for use in conveying an object of relatively low rigidity such as a lightweight object or a sheet material. In particular, it has been difficult to stably convey paper, a rubber sheet, a plastic sheet or the like by means of such a conventional apparatus.

An apparatus of the type disclosed in Japanese Patent Unexamined Publication No. 61-51435 is known as an apparatus for conveying a sheet material. This apparatus has an A.C. power source, an electrostrictive device, and a vibrator serving as a means for transmitting to a sheet material the vibration generated by driving the electrostrictive device. The vibrator has an end which is cut so as to form an acute angle, and the vibrator kicks a surface of the sheet material by means of its end to convey the sheet material. However, such a sheet-material conveying apparatus has the problem that since the sheet material is kicked out by the acute end of the vibrator when in contact with the sheet material, the surface of the sheet material is scratched. In addition, the end of the vibrator easily wears and its conveying capability deteriorates due to the wear. Accordingly, it is difficult to keep the conveying capability stable over a long period.

SUMMARY OF THE INVENTION

It is therefore an object of the present invention to provide a method of and an apparatus for conveying an object, both of which can maintain stable conveyance of the object over a long period.

It is another object of the present invention to provide a method of and an apparatus for conveying an object, both of which can achieve efficient conveyance of the object.

To achieve the above and other objects, in accordance with one aspect of the present invention, there is provided an apparatus for conveying an object, which comprises a vibrating-type driving unit to generate a vibration at an end surface of a driving head by the application of an A.C. voltage, a roller arranged to be opposed to the driving head of the vibrating-type driving head and supported for rotation about its axis in a direction in which the object is conveyed, pressure applying means for applying pressure to a portion of the object which is present in a gap between the vibrating-type driving unit and the roller when the object is being passed therethrough, and a power source for supplying electric power to the vibrating-type driving unit.

In accordance with another aspect of the present invention, there is provided an apparatus for conveying an object which comprises a roller disposed for rotation about its axis in a direction of travel of the object to be conveyed, a vibrating-type driving unit having a driving head disposed at a location opposing the roller, object-presence detecting means for detecting that the object is present in or near a gap between the roller and the driving head, and relay means arranged to cut off supply of electric power to the vibrating-type driving unit for a period during which absence of the object is detected by the object-presence detecting means.

The above and other objects, advantages and features of the present invention will become apparent from the following description of the preferred embodiment thereof, taken in conjunction with the accompanying drawings.

DESCRIPTION OF THE PREFERRED EMBODIMENTS

Preferred embodiments of the present invention will be described in detail below with reference to the accompanying drawings.

Figure 1:
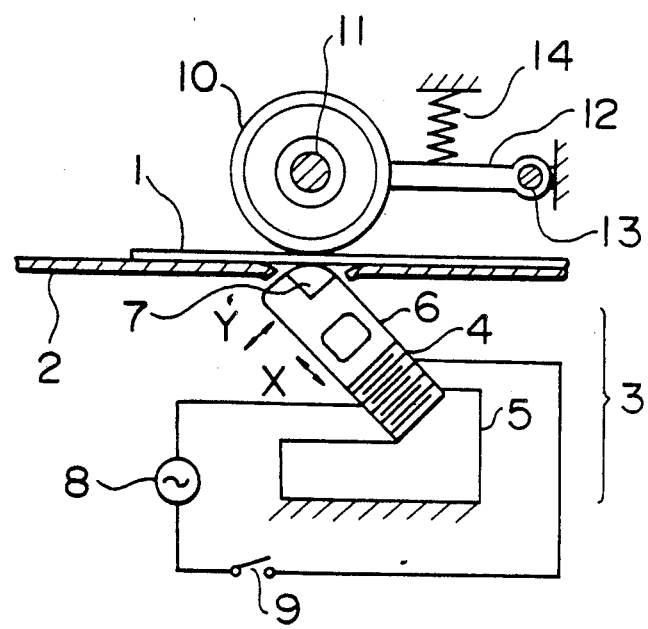
FIG. 1 is a diagrammatic view of one embodiment of the present invention.

FIG. 1 is a view diagrammatically showing a first embodiment of the present invention.

In FIG. 1, a sheet material such as a sheet of paper or a card is denoted by reference numeral 1, and a guide plate 2 is disposed to guide the sheet material 1, an opening being formed in a portion of the guide plate 2.

A vibrating-type driving unit 3 is arranged to generate a vibration and drive the sheet material 1 by using the vibration. The vibrating-type driving unit 3 comprises a laminated-type piezoelectric device (or electrostrictive device) 4, a base 5 on which the piezoelectric device 4 is mounted, a vibrator 6 for transmitting the vibration of the piezoelectric device 4, and a driving head 7 disposed at the distal end of the vibrator 6 and adapted to come into contact with the sheet material 1 to drive the sheet material 1. A vibrating direction of the piezoelectric device 4 is inclined with respect to the surface of the sheet material 1.

A laminated-type piezoelectric device is usually employed as the piezoelectric device 4 to decrease the level of an applied voltage. The vibrator 6 may be fixed to the base 5 by tightening a bolt which is inserted through a through-hole formed in the piezoelectric device 6 or by bonding. The vibrator 6 has a parallel leaf-spring structure whose rigidity is high in the vibrating direction X but which is elastically deformed in the direction Y perpendicular to the vibrating direction X.

It is to be noted that the flexural rigidity of the leaf springs of the vibrator 6 is selected so that the mechanical resonant frequency f1 of the structure in the X direction thereof, including the piezoelectric device 4, may coincide with the mechanical resonant frequency f2 of the vibrator 6 in the Y direction.

In this embodiment, by way of example, the portion of the driving head 7 which comes into contact with the sheet material 1 has a curved configuration. However, a flat configuration may be adopted.

An A.C. power source for applying a high-frequency voltage across the piezoelectric device 4 is denoted by reference numeral 8, and a control switch is denoted by reference numeral 9.

Furthermore, a follower roller 10 is opposed to the vibrating-type driving unit 3 and is adapted to clamp and convey the sheet material 1. A roller shaft 11 is disposed to rotatably support the follower roller 10. The roller shaft 11 is supported by a roller arm 12, and the roller arm 12 is pivotally supported by an arm shaft 13. A coil spring 14 is disposed to apply a predetermined magnitude of pressure to the follower roller 10. As occasion demands, a leaf spring may be employed in place of the combination of the roller arm 12 and the coil spring 14. In this arrangement, one end of the leaf spring is fixed so that a predetermined magnitude of flexure may occur in the leaf spring, and the follower roller 10 may be provided on the other end of the leaf spring so that a pressure may be applied to the follower roller 10.

In this embodiment, in order to improve the efficiency of conveyance, the material and surface roughness of the follower roller 10 and those of the driving head 7 are selected so that a friction coefficient $\mu 2$ between the follower roller 10 and the sheet material 1 may be greater than a friction coefficient $\mu 1$ between the driving head 7 and the sheet material 1.

The operation of the first embodiment of the present invention will be described hereinafter with reference to FIGS. 1 and 2.

As shown in FIG. 1, when an A.C. voltage of mechanical resonant frequency f1 is applied across the piezoelectric device 4, the vibratory displacement of the vibrator 6 occurs in the X direction and, at the same time, variations in the contact pressure of the driving head 7 act as a vibromotive force to cause the vibratory displacement of the vibrator 6 in the Y direction as well. Accordingly, the driving head 7, as shown in FIG. 2, makes a small elliptical vibration A.

Figure 2:
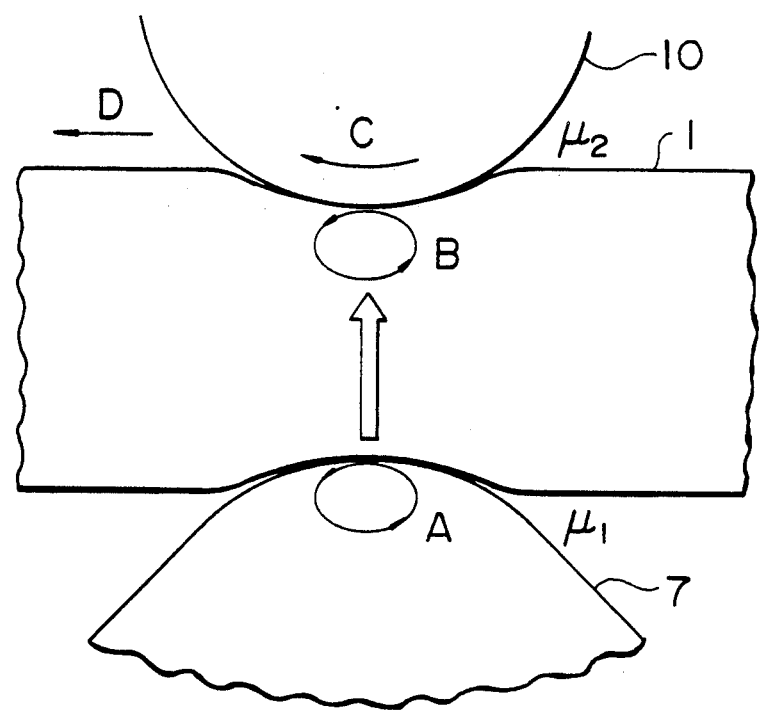
FIG. 2 is a view which serves to illustrate the principle of conveyance in the embodiment shown in FIG. 1.

FIG. 2 is a view which serves to illustrate the principle of the driving operation according to the present invention, and shows on an enlarged scale the contact portions of the follower roller 10, the sheet material 1 and the driving head 7. Since, in general, the sheet material 1 is soft, it is shown as locally reduced in thickness by the pressure produced between the follower roller 10 and the driving head 7.

Normally, the thickness of the sheet material 1, for example, paper is on the order of 100 $\mu$m, while the amplitude of vibration of the driving head 7 is on the order of several $\mu$m and, in addition, the local inertial mass of paper is extremely small. It is therefore difficult to convey paper only by the vibration of the driving head 7.

For this reason, in this embodiment, the elliptical vibration A of the driving head 7 is transmitted to the sheet material 1 at the follower roller side to produce an elliptical vibration B therein, thereby rotating the follower roller 10 in the direction indicated by an arrow C. Since the inertia of rotation of the follower roller 10 is large, the follower roller 10 smoothly rotates in one direction by the difference between the driving forces above and below the elliptical vibration B. Furthermore, in this embodiment, the material and surface roughness of each of the follower roller 10 and the driving head 7 are selected so that the friction coefficient $\mu 2$ between the follower roller 10 and the sheet material 1 may be greater than the friction coefficient $\mu 1$ between the contact end of the driving head 7 and the sheet material 1. Accordingly, the sheet material 1 is efficiently conveyed in the direction indicated by an arrow D, by the rotation of the follower roller 10.

Accordingly, the above-described embodiment provides the following advantages. Since the friction coefficient $\mu 2$ between the follower roller 10 and the sheet material 1 is greater than the friction coefficient $\mu 1$ between the contact end of the driving head 7 and the sheet material 1, the sheet material 1 can be conveyed efficiently. In addition, since the surface of the driving head 7 is formed into a curved or flat shape, even if the surface of the driving head 7 or the follower roller 10 is somewhat worn, the performance of conveyance is not greatly influenced. Accordingly, it is possible to achieve a sheet-material conveying mechanism having durability and reliability.

Figure 3:
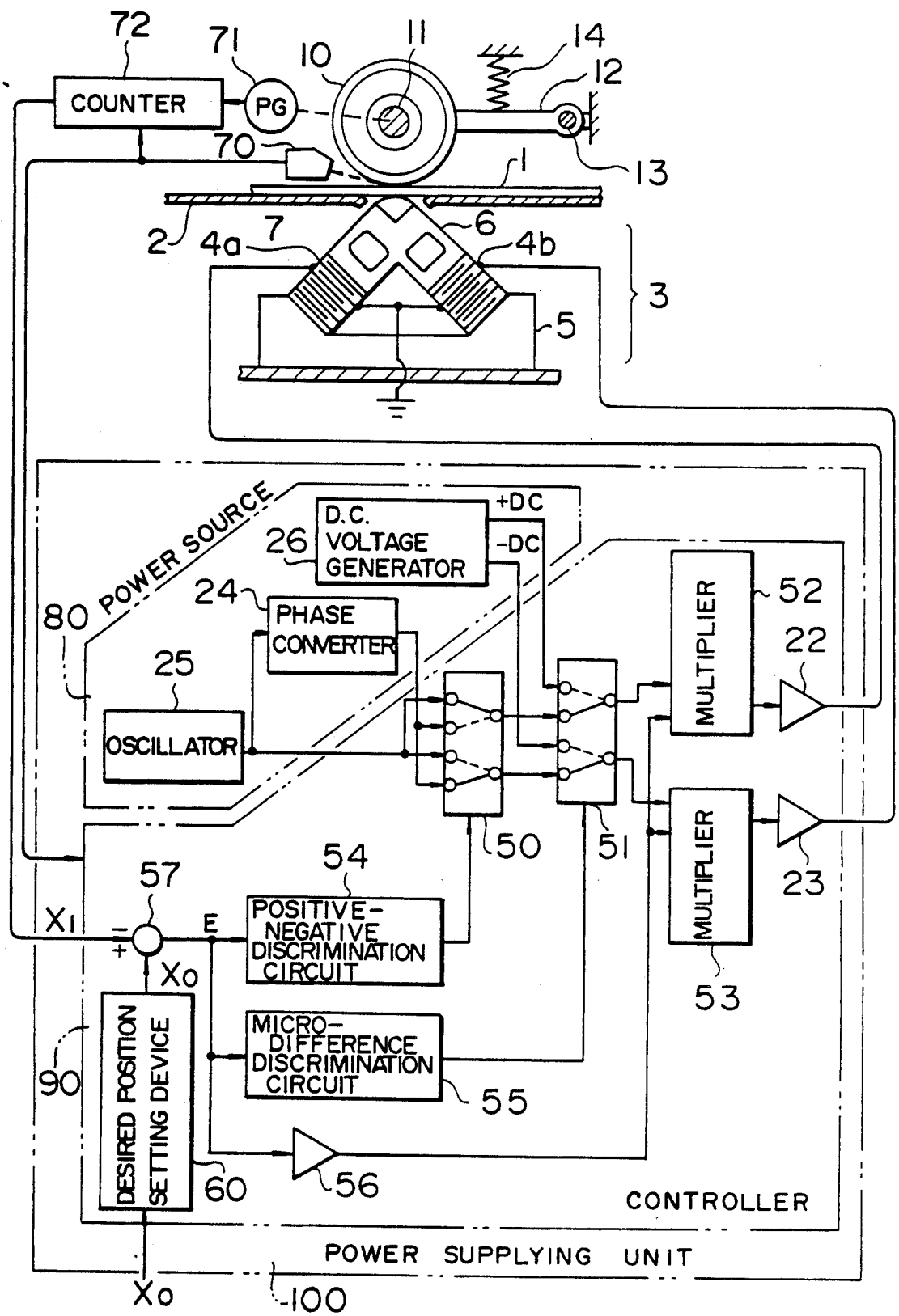
FIG. 3 is a diagrammatic view of another embodiment of the present invention.

Another embodiment of the present invention will be described hereinafter with reference to FIG. 3. In FIG. 3, the same reference numerals are used to denote the same portions as those shown in FIG. 1.

In this embodiment, the vibrating-type driving unit 3 includes a pair of piezoelectric devices 4a and 4b. The vibrating direction of the locus of the elliptical of the contact end of the driving head 7 can be switched over by applying a high-frequency voltage across the piezoelectric device 4a and 4b in a switched manner or, alternatively, by applying high-frequency voltages which differ in phase from each other by a predetermined angle (for example, 90 degrees) to the piezoelectric devices 4a and 4b, respectively, and switching them from one to the other. The vibrating-type driving unit 3 is driven by the electrical power supplied from a power supplying unit 100. The power supplying unit 100 in this embodiment includes a power source 80 and a controller 90 and is constructed so as to control the position of the sheet material 1 to be conveyed. In particular, this embodiment is provided with an unique arrangement in order to increase the precision with which the sheet material 1 is positioned. The power source 80 includes an oscillator 25 for generating an A.C. voltage, a phase converter 24 for delaying the phase of the voltage generated by the oscillator 25 by 90 degrees, and a D.C. voltage generator 26. The controller 90 has a function of regulating the power supplied from the power source 80. The controller 90 in this embodiment includes amplifiers 22 and 23, multipliers 52 and 53, circuit-switching selectors 50 and 51, a positive-negative discrimination circuit 54, an micro-difference discrimination circuit 55, an amplifier 56, an adder 57, and a desired-position setting device 60. A sensor 70 is disposed to detect whether or not the leading end of the sheet material 1 or object to be conveyed has reached a fixed point or whether or not the object 1 is present at the fixed point. A pulse generator 71 is disposed to generate electrical pulses according to the rotation of the follower roller 10. An up/down counter 72 serves to count the electrical pulses and detects the position $X_1$ of the object 1 by utilizing the fact that the sensor 78 has detected the leading end of the object 1. The counter 72 may be provided in the controller 90.

As shown in FIG. 3, when the object 1 is conveyed into the gap between the driving unit 3 and the follower roller 10 by a conveying means (not shown), the sensor 70 detects the presence of the object 1. In response to the detection signal supplied from the sensor 70, the adder 57 of the controller 90 performs arithmetic operations upon the difference E between a value $X_0$ of the desired-position setting device 58 and the present position $X_1$ of the object 1. Subsequently, these arithmetic operations are repeated. The difference E is input to the positive-negative discrimination circuit 54, the micro-difference discrimination circuit 55, and the amplifier 56. The positive-negative discrimination circuit 54 makes a decision as to the algebraic sign of the input difference E. In accordance with the algebraic sign of the difference E, the analog switch 50 effects switching between the resonant frequency high-frequency voltage supplied from the oscillator 2 and the resonant frequency high-frequency voltage whose phase has been delayed by an angle of 90 degrees through the phase converter 24. Then, the microdifference discrimination circuit 55 compares the input difference E with a predetermined reference difference $\epsilon$ to effect switching between the high-frequency voltage supplied from the analog switch 50 and the D.C. voltage supplied from the D.C. voltage generator 26. The adders 52 and 53 multiply the outputs of the analog switch 51 by the differences E, respectively. The resultant voltages, as a drive voltage corresponding to the difference E, is applied across the driving unit 3 through the amplifiers 22 and 23.

Figure 14:
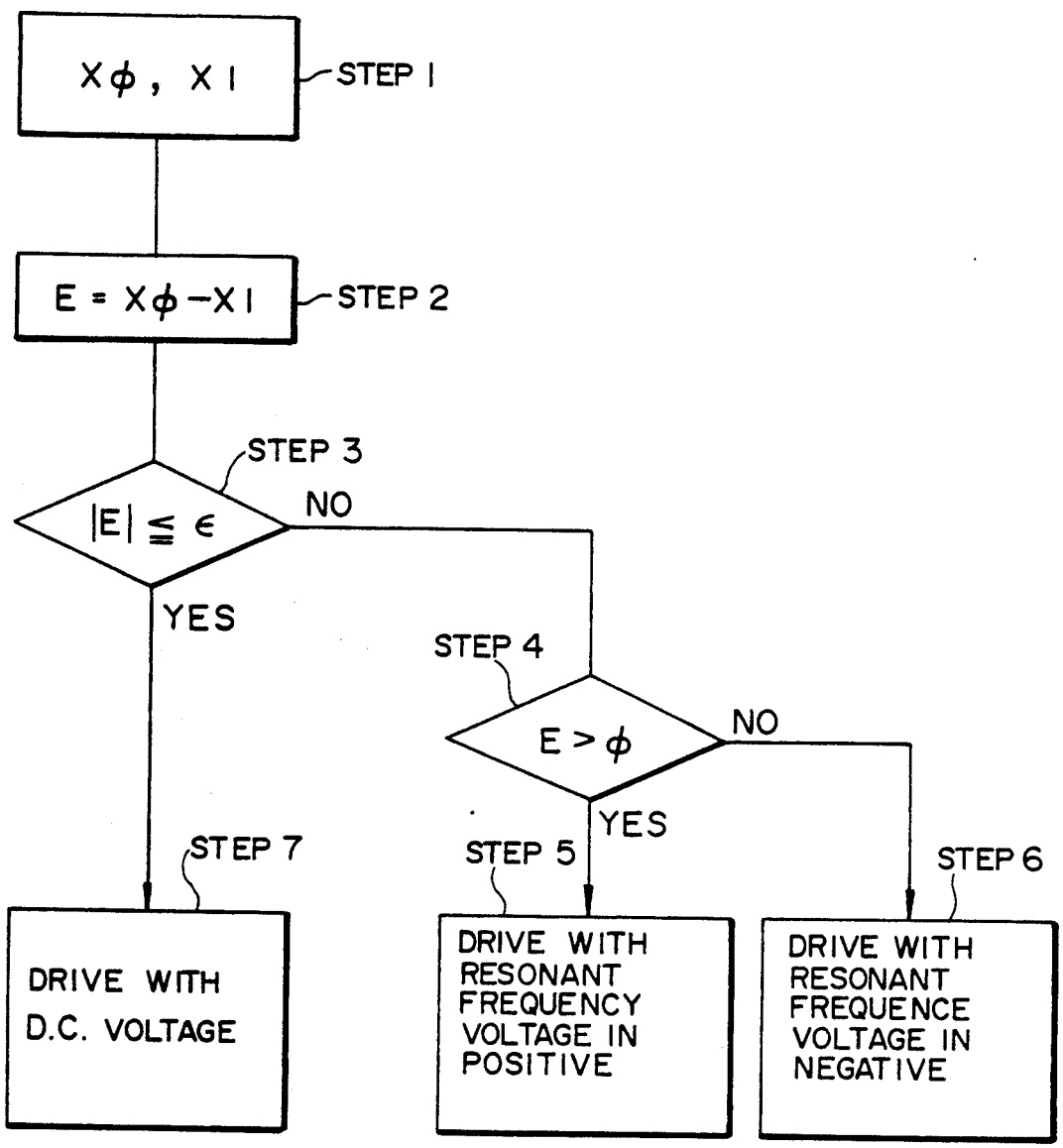
FIG. 14 is a flow chart of the driving control used in the embodiment shown in FIG. 3.

FIG. 14 is a flow chart showing the flow of the arithmetic operations performed by the controller 90. As shown in FIG. 14, in Step 1, a desired position $X\phi$ is confirmed and the present position $X_1$ is detected. Then, in Step 2, the difference E is found. Subsequently, in Step 3, a discrimination is made as to whether or not the absolute values $|E|$ of the difference E is greater than the reference difference $\epsilon$.

If $|E|>\epsilon$, the process proceeds to Step 4, in which the direction in which a piezoelectric motor is driven is determined by the algebraic sign of the difference E. If $E>\epsilon$, the process proceeds to Step 5, in which the piezoelectric motor is driven in the positive direction by the resonant frequency high-frequency voltage. If $E<-\epsilon$, the process proceeds to Step 6, in which the piezoelectric motors driven in the negative direction by the resonant frequency high-frequency voltage.

If it is determined in Step 3 that $|E|\leq\epsilon$, the process proceeds to Step 7, in which the piezoelectric motor is driven by the D.C. voltage.

In this embodiment, the piezoelectric motor is controlled by the method described hereinbefore. The fine drive employing the small displacement caused by the D.C. voltage driving shown in FIG. 3 will be described in further detail. First, D.C. voltages at an optimum level are applied across the piezoelectric devices 4a and 4b in the directions reverse to each other. For example, a negative D.C. voltage is applied across the piezoelectric device 4a, with a positive D.C. voltage across the piezoelectric device 4b. In this case, the piezoelectric device 4a is contracted, while the piezoelectric device 4b is expanded. If the displacement of each of the piezoelectric devices 4a and 4b is represented by a, their displacements are transmitted to the respective ends without interferring with each other since the vibrator 6 has a parallel link structure. Accordingly, the driving head 7 is displaced with respect to the facing surface of a driven member in the horizontal direction thereof by an amount of $2\sqrt{a}$. Thus, the follower roller 10 is rotated by an amount corresponding to the displacement, and the object 1 is moved by a corresponding small amount. The displacement a of each of the piezoelectric devices 4a and 4b is proportional to the value of the D.C. voltage applied across each of them. Accordingly, it is possible to arbitrarily adjust the amount of displacement of the driven member by adjusting the values of such D.C. voltages.

Thus, when the driven member has reached a position corresponding to the reference difference while it is approaching the desired position, it is possible to achieve high-precision small displacement proportional to the values of the above D.C. voltages.

Accordingly, it is possible to positively and accurately locate the driven member at the desired position and hence to achieve the accurate positioning of the driven member.

The piezoelectric motor used in the above-described embodiment is a so-called XY vibrator-type piezoelectric motor. However, the present invention can of course be applied to another type of piezoelectric motor such as a travelling-wave type of motor.

As a matter of course, if a program for executing processing such as that shown in FIG. 14 is stored in a suitable memory means, the controller 90 can be constructed using an ordinary computer.

Figure 15:
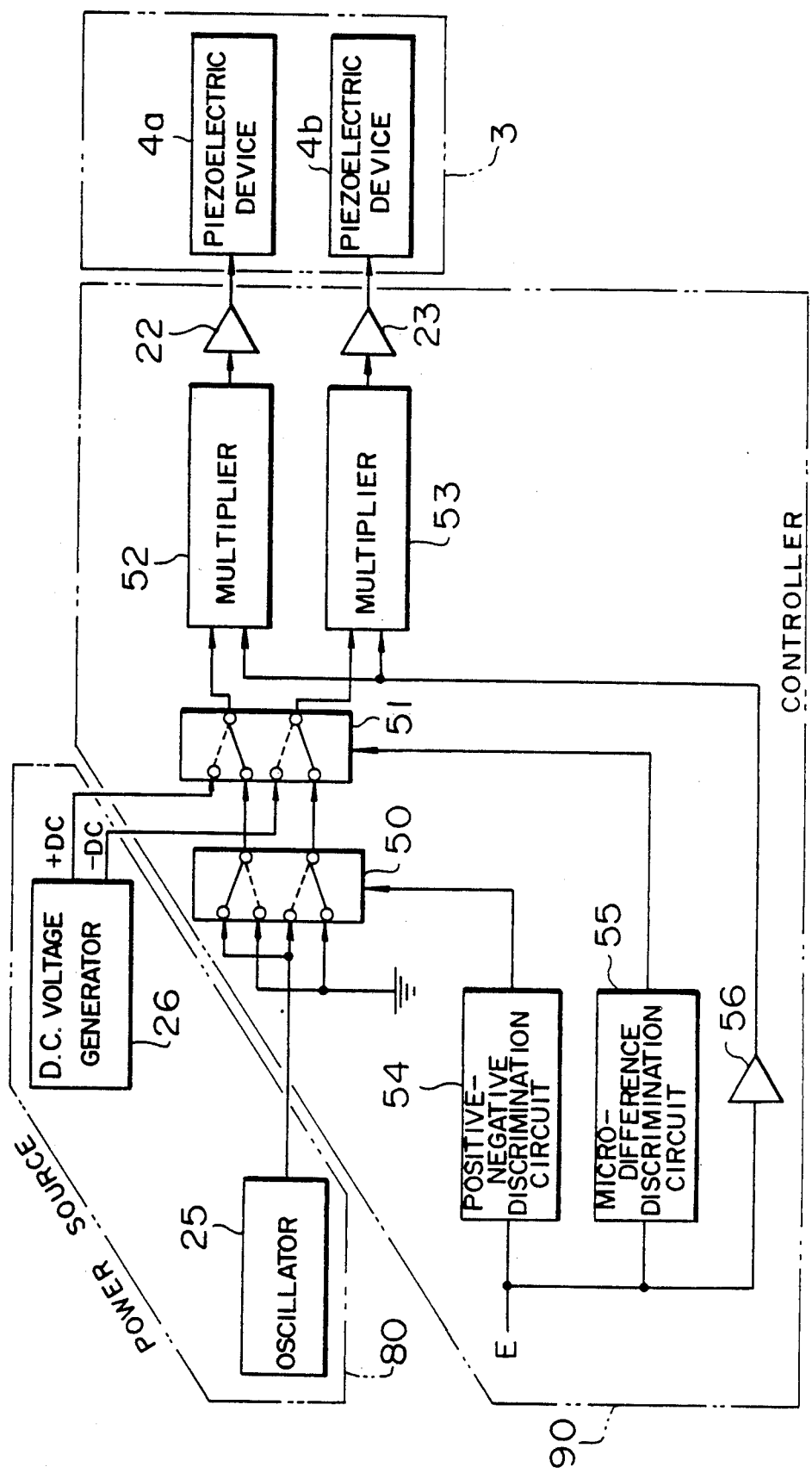
FIGS. 15, 16 and 17 are block diagrams respectively showing specific examples of the power supplying unit shown in FIG. 3.

FIG. 15 shows a modified form of the power supplying unit 100 shown in FIG. 3. In FIG. 15, the same reference numerals are used to denote the same positions as those shown in FIG. 3.

Although, in the embodiment shown in FIG. 3, a high-frequency voltage which has been delayed by a phase angle of 90 degrees in the phase converter 24 is used to drive the piezoelectric motor, the modified form shown in FIG. 15 is arranged such that the piezoelectric motor is driven by using a method of grounding, that is, only by the vibration of one of the piezoelectric devices. Since this arrangement does not require any adjustment of the phases of applied voltages, driving at a resonant frequency can be easily achieved and great effects can be provided in practice.

Figure 16:
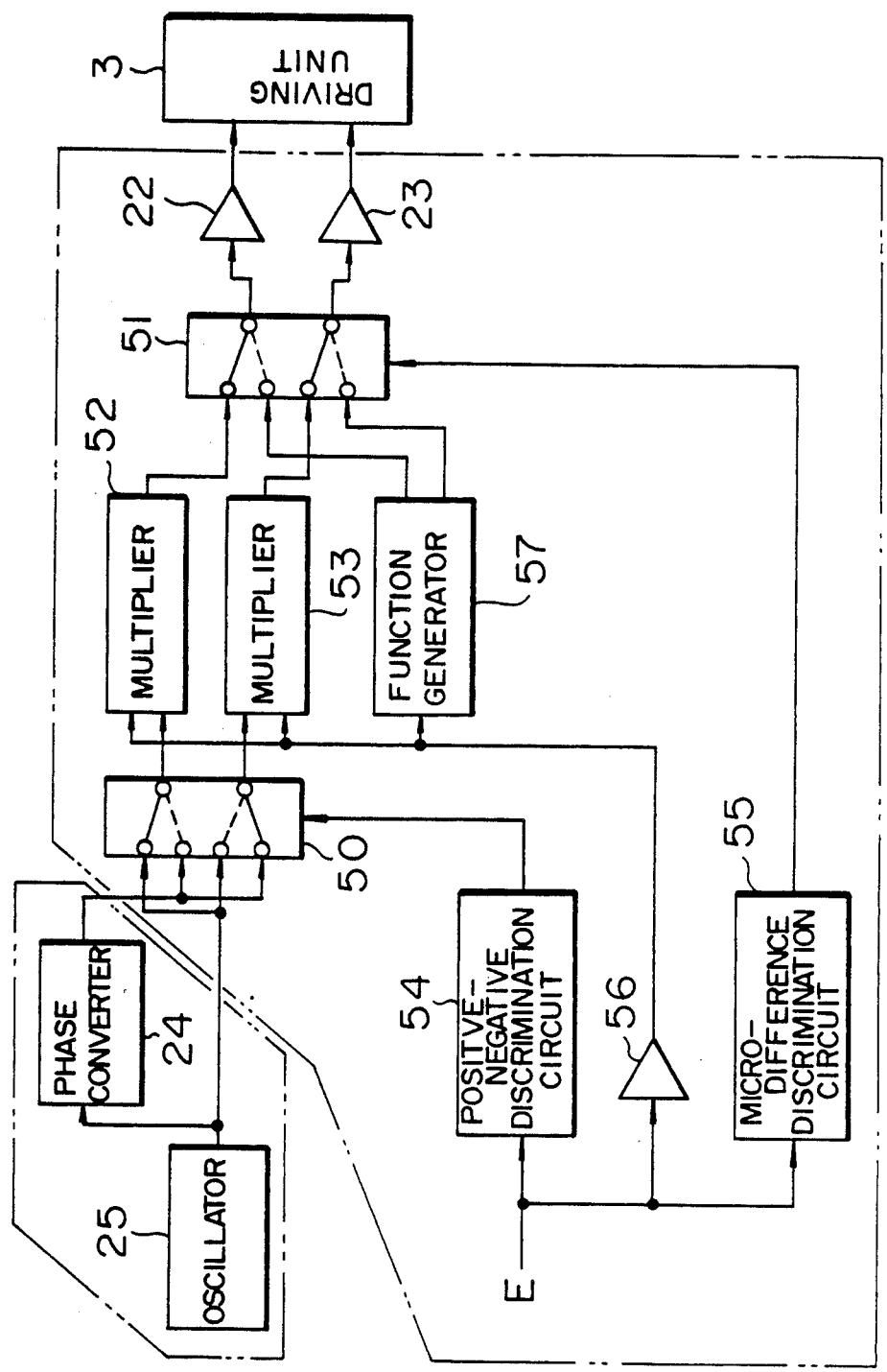

FIG. 16 is a block diagram showing an embodiment of a driving circuit for a travelling wave-type piezoelectric motor. In FIG. 16, the same reference numerals are used to denote the same portions as those shown in FIG. 3.

The oscillator 25 generates a resonant frequency high-frequency voltage for driving the piezoelectric devices and the phase converter 24 receives the high-frequency voltage from the oscillator 25, delays the phase thereof by an angle of 90 degrees, and outputs the result.

The positive-negative discrimination circuit 54 and the micro-difference discrimination circuit 55 are simply constituted by an operational amplifier, a resistor and so forth.

In this circuit, when the positive-negative discrimination circuit 54 receives the difference E, it makes a decision as to the algebraic sign of the difference E. On the basis of the algebraic sign of the difference E, the switch 50 effects switching between the resonant frequency high-frequency voltage supplied from the oscillator 25 and the resonant frequency high-frequency voltage whose phase has been delayed by 90 degrees by the phase converter 24 and then applies the thus-switched outputs to the multipliers 52 and 53. The respective multipliers 52 and 53 multiply these outputs by the differences E supplied from the amplifier 56 to provide the resultant voltages. In the meantime, a function generator 57 generates a D.C. voltage in accordance with the value of the difference E. The micro-difference discrimination circuit 55, as described above, compares the error E with the predetermined reference difference and, on the basis of the result of this comparison, the switch 51 effects switching between the voltages supplied from the multipliers 52 and 53 and the voltages supplied from the function generator 31. The switched outputs from the switch 51 are applied across the piezoelectric devices through the amplifiers 22 and 23, respectively.

Figure 17:
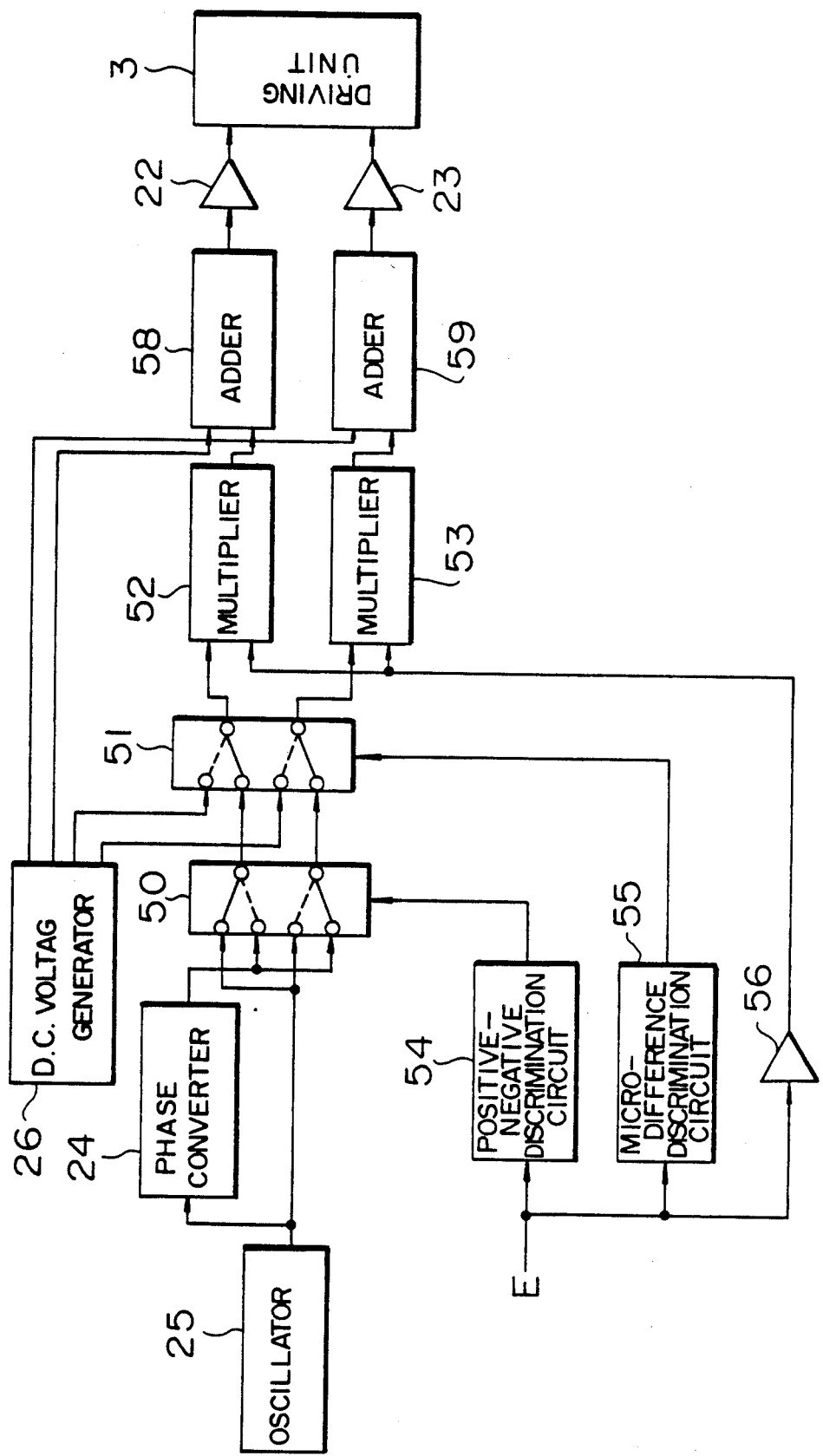

FIG. 17 is a block diagram which serves to illustrate a case where a travelling-wave motor is used to implement a fine driving such as that shown in FIG. 3. In FIG. 17, the same reference numerals are used to denote the same portions as those shown in FIG. 3. The circuit of FIG. 17 include adders 58 and 59 in addition to the circuit arrangement shown in FIG. 15, and is characterized in that offset voltages can be added to the output voltages of the multipliers 52 and 53, respectively.

In each of the embodiments described above, by way of example, a piezoelectric device or an electrostrictive device is used as the vibration source of the vibrating-type driving unit. However, a magnetostrictive device, a voice coil or the like may be used to generate vibration.

In each of the above-described embodiments, only if the friction coefficient $\mu_2$ is slightly greater than the friction coefficient $\mu_1$, the sheet material 1 can be stably conveyed by the follower roller 10. However, there is some possibility that the values of the $\mu_1$ and $\mu_2$ are slightly varied under the influence of variations in the state of the surface of the sheet material 1 or the pressure applied thereto. Accordingly, it is desirable that the value of the $\mu_2$ be selected to be greater than that of the $\mu_1$ by at least several to some tens of percent so that the relation of $\mu_2 > \mu_1$ may consistently be maintained even when a certain extent of conditional variation occurs.

Figure 4:
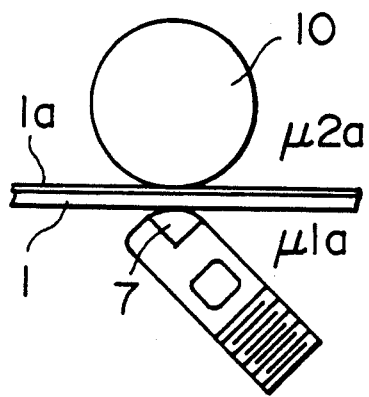
FIGS. 4 and 5 are diagrammatic views which serve to illustrate the conveyance of a sheet.
Figure 5:
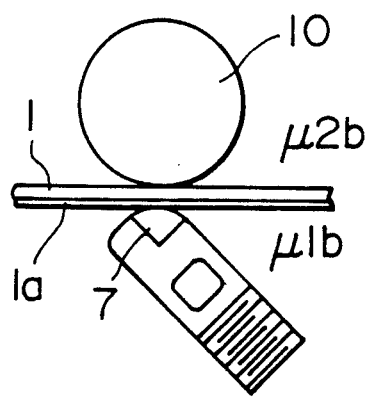

FIGS. 4 and 5 shows another embodiment in which the conveying mechanism of the present invention is applied to a case using a sheet material whose opposite surfaces differ in nature from each other. In these drawings, the same reference numerals are used to denote the same portions as those shown in FIG. 1. If, for example, one of the opposite surfaces of the sheet material 1 is coated with a coating $1a$ such as a light-sensitive material or a heat-sensitive material, the sheet material 1 whose opposite surfaces differ in nature from each other can be obtained. If, as shown in FIG. 4, $\mu_{1a}$ represents the friction coefficient between the driving head 7 and the surface of the sheet material 1 which is not coated with the coating $1a$ and $\mu_{2a}$ represents the friction coefficient between the follower roller 10 and the surface of the sheet material 1 which is coated with the coating $1a$, as well as if, as shown in FIG. 5, $\mu_{1b}$ represents the friction coefficient between the driving head 7 and the surface of the sheet material 1 which is coated with the coating $1a$ and $\mu_{2b}$ represents the friction coefficient between the follower roller 10 and the surface of the sheet material 1 which is not coated with the coating $1a$, there will be a case where $\mu_{1a} \neq \mu_{1b}$ and $\mu_{2a} \neq \mu_{2b}$. In this case, if the material and the surface roughness of each of the driving head 7 and the follower roller 10 are selected so that $\mu_{1a} < \mu_{2a}$ and $\mu_{1b} < \mu_{2b}$ may be obtained, it is possible to convey the sheet material 1 by means of the follower roller 10 irrespective of the obverse and reverse surfaces of the sheet material 1.

If the material and surface roughness of each of the driving head 7 and the follower roller 10 are selected so that $\mu_{1a} < \mu_{2a}$ and $\mu_{1a} > \mu_{1b}$ may be obtained, the sheet material 1 which is placed in the state shown in FIG. 4 can be conveyed but it is difficult to convey the one which is placed in the state shown in FIG. 5. Accordingly, the present mechanism may preferably be provide with a function of discriminating between the obverse and reverse surfaces of a sheet material to be conveyed. It is apparent that even if the material and surface roughness of each of the driving head 7 and the follower roller 10 are selected so that $\mu_{1a} > \mu_{2a}$ and $\mu_{1b} < \mu_{2b}$ may be obtained, it is possible to achieve similar effects.

Figure 6:
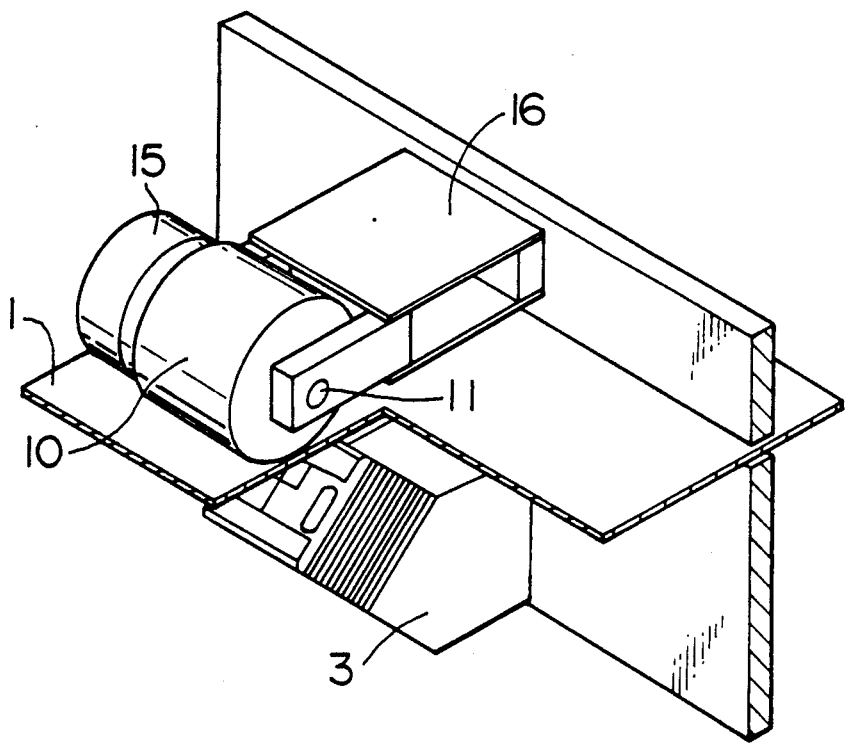
FIG. 6 is a perspective view of another embodiment, and shows the actuator portion used therein.

FIG. 6 shows yet another embodiment of the present invention and, in this drawing, the same reference numerals are used to denote the same portions as those shown in FIG. 1. This embodiment differs from the embodiment of FIG. 1 in that a detector 15 for detecting the angle of rotation of the follower roller 10 is disposed coaxially to the roller shaft 11 of the follower roller 10 and in that a parallel leaf-spring assembly 16 is employed to apply a pressure to the follower roller 10.

Figure 7:
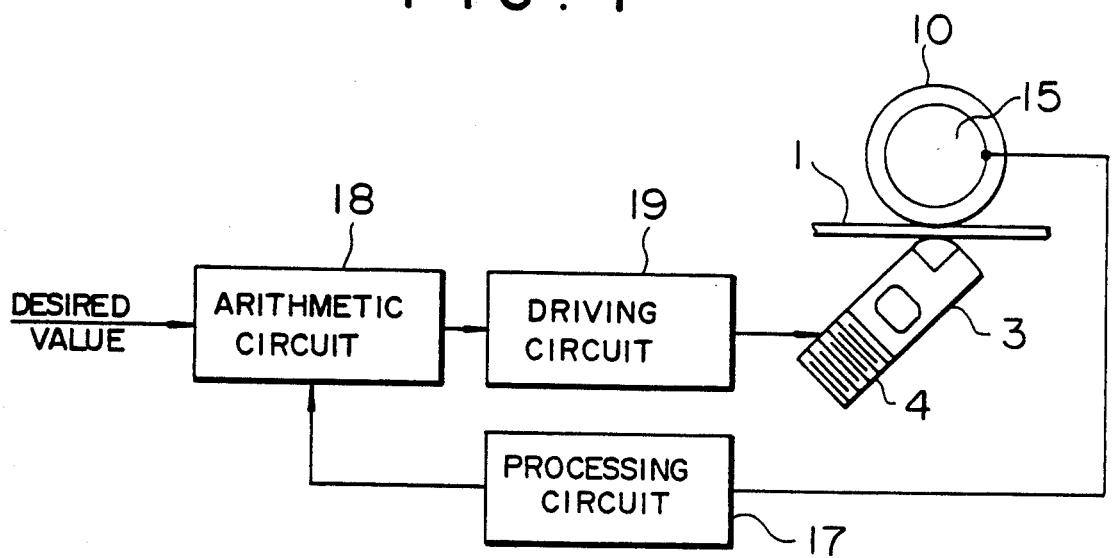
FIG. 7 is a block diagram of the driving control used in the embodiment shown in FIG. 6.

FIG. 7 is a block diagram showing an example of a driving circuit for the apparatus shown in FIG. 6 and, in FIG. 7, the same reference numerals are used to denote the same portions as those shown in FIGS. 1 and 6. In FIG. 7, the output of the detector 15 is converted, by a processing circuit 17, into a rotational-speed signal representing the rotational speed of the follower roller 10. The rotational-speed signal is input to a servo arithmetic circuit 18, in which the value of the rotational-speed signal is compared with a desired value of the rotational speed. If the value of the rotational-speed signal is smaller than the desired value, the output of the servo arithmetic circuit 18 is increased, while if the value of the rotational-speed signal is greater than the desired value, the output of the servo arithmetic circuit 18 is decreased. The output of the servo arithmetic 18 is input to a driving circuit 19. The driving circuit 19 serves to output an A.C. voltage of amplitude proportional to the magnitude of the input signal, and the piezoelectric device 4 is driven by the output A.C. voltage. With this driving system, it is possible to control the speed of conveyance of the sheet material 1 in accordance with the desired value. Furthermore, the angle of rotation of the follower roller 10 may be obtained from the output of the detector 15 and the information thus obtained can be utilized to position the sheet material 1. In other words, by utilizing the fact that, since the friction coefficient between the sheet material 1 and the follower roller 10 is large and the follower roller 10 suffers little resistance during rotation thereof, little slippage occurs between the portions of the sheet material 1 and the follower roller 10 which are brought into contact with each other, the amount or speed of conveyance of the sheet material 1 is obtained from the angle of rotation of the follower roller 10 or the rotational speed thereof, and therefore the position or speed of the sheet material 1 can be controlled.

Figure 8:
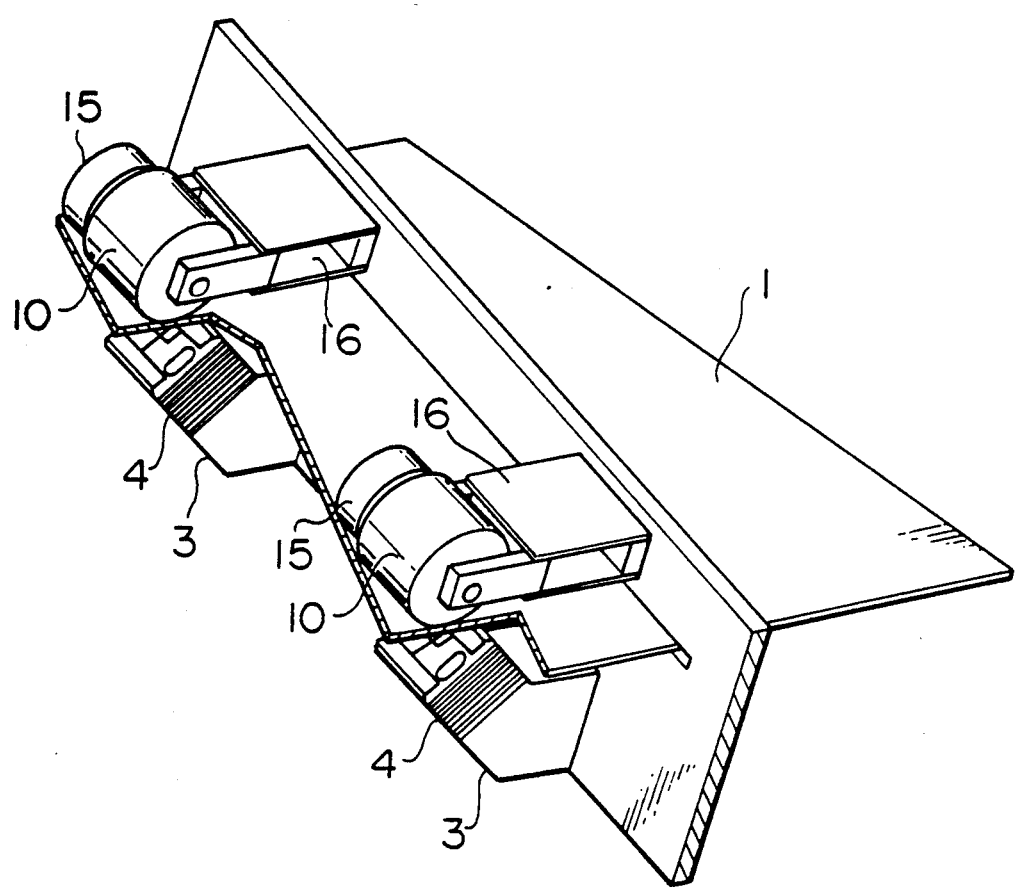
FIG. 8 is a perspective view of an actuator portion according to another embodiment of the present invention.

FIG. 8 shows still another embodiment of the present invention and, in the drawing, the same reference numerals are used to denote the same portions as those shown in FIGS. 1 and 6. In this embodiment, two pairs of the vibrating-type driving unit 3 and the follower roller 10 are disposed for a single sheet material 1. The posture of the sheet material 1 which is being conveyed can be changed by individually controlling the state of the electric power supplied to each of the two piezoelectric devices 4, such as the level of A.C. voltages applied across each of them and the frequency and waveform of each of the A.C. voltages. Thus, if a skew detector is provided and control is provided so as to diminish the skew detected by the skew detector, it is possible to prevent the occurrence of skew. The skew detector comprises a light projector provided above the sheet material to be conveyed and two photo-detectors provided below and along an edge of the sheet material in the conveying direction. The photo-detectors are spaced apart from each other. If a skew is occurred, the amount of the light received by the photo-detectors are different from each other, thus the degree of the skew is detected. In accordance with the amount of the skew, a voltage to be supplied to at least one of the vibrating-type driving units 3 is controlled so as to diminish the amount of the skew. The number of pairs of the vibrating-type driving unit 3 and the follower roller 10 is not limited to two and, for example, it is of course possible to provide not less than three pairs for a single sheet material.

Figure 9:
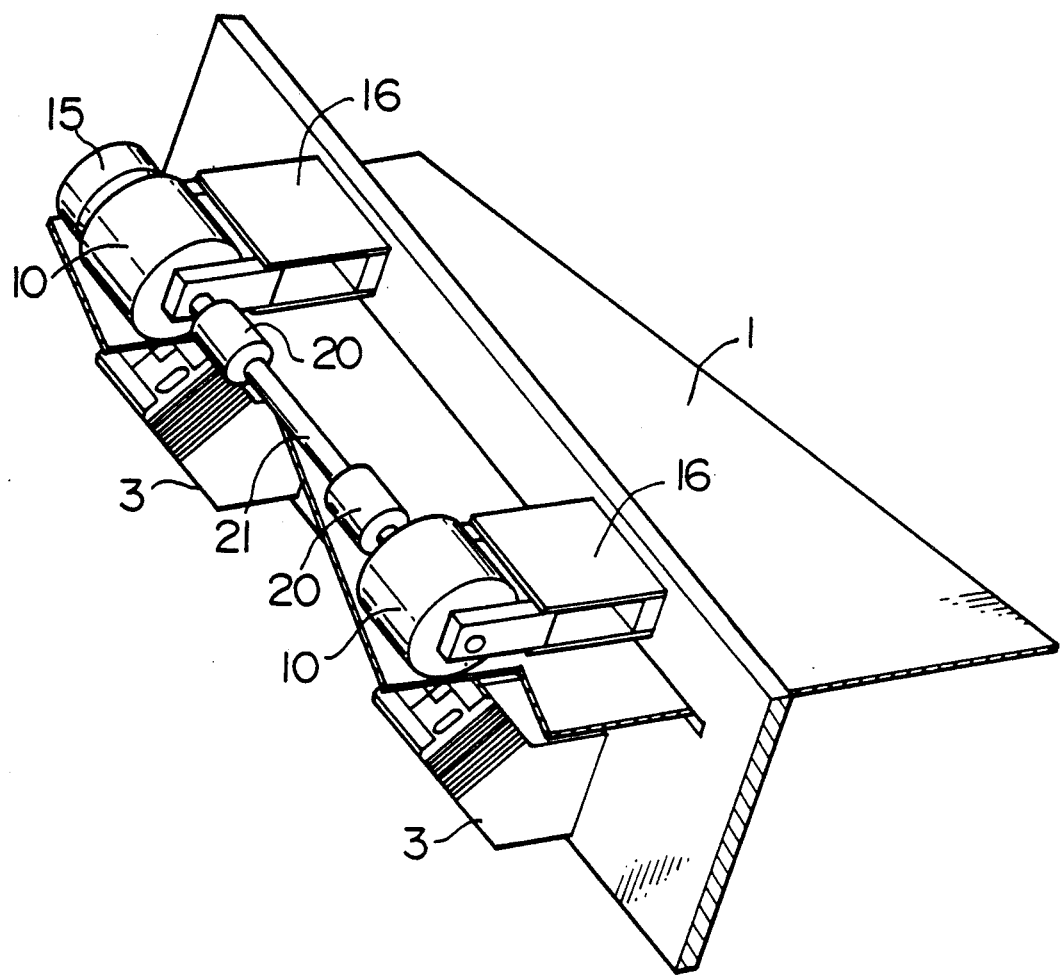
FIG. 9 is a perspective view of an actuator portion according to another embodiment of the present invention.

FIG. 9 is a still another embodiment of the present invention and, in this drawing, the same reference numerals are used to denote the same portions as those shown in FIG. 8. This embodiment differs from the embodiment shown in FIG. 8 in that the two follower rollers 10 are connected by couplings 20 and a connecting shaft 21. As described above, little slippage occurs in the portions of the sheet material 1 and the follower roller 10 which are brought into contact with each other. Accordingly, as far as the two follower rollers 10 are equal in diameter and are rotated at an equal speed, the sheet material 1 is conveyed straightforwardly even if the amplitude of vibration and the number of vibrations of either of the two vibrating-type driving units 3 slightly differ from those of the other.

Figure 10:
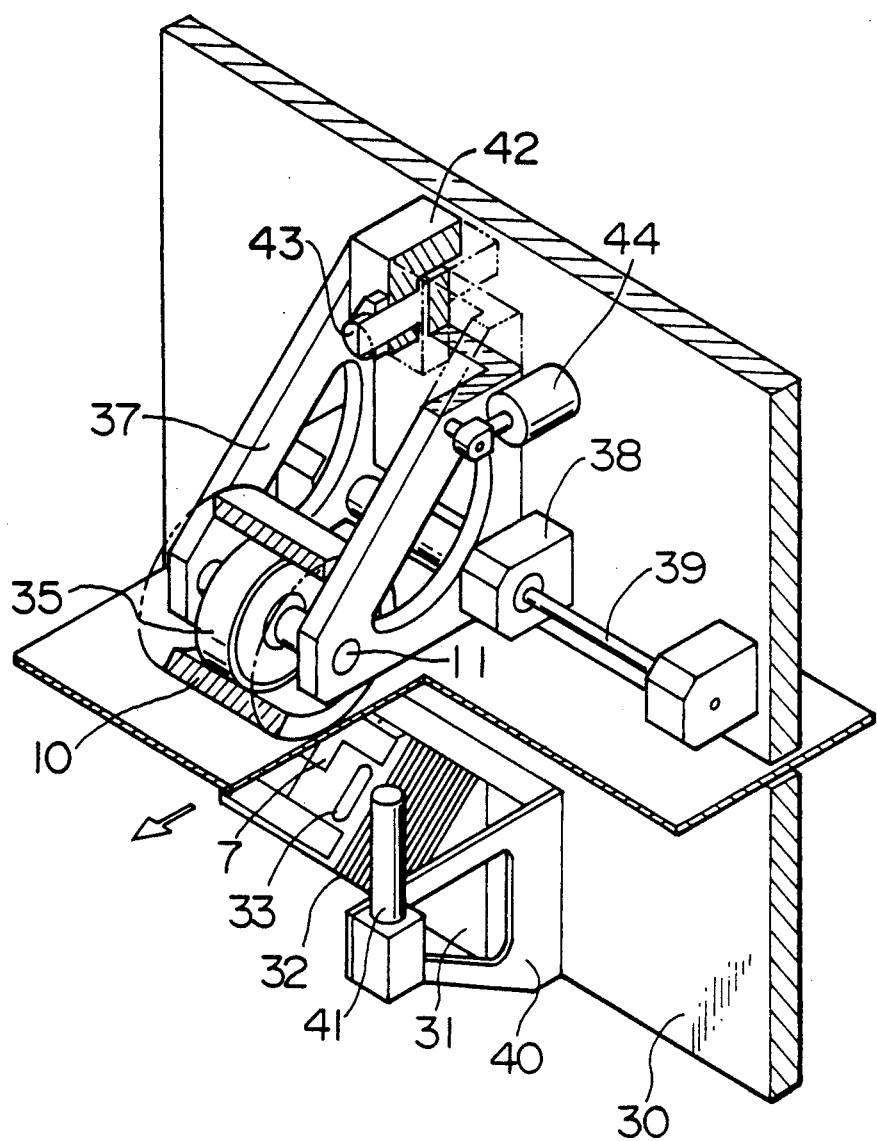
FIG. 10 is a perspective view of an actuator portion according to another embodiment of the present invention.

A further embodiment of the present invention will be described below with reference to FIG. 10. As illustrated, an electrostrictive device 32 is supported by a base 31 mounted on a fixed portion 30, and the driving head 7 is mounted on a transmission portion 33 connected to the electrostrictive device 32. The transmission portion 33 and the driving head 7 constitute a vibrator, and the fixed portion 30, the base 31, the electrostrictive device 32 and the vibrator constitute the vibrating-type driving unit 3.

The follower roller 10 which is supported by a bearing 35 is opposed to the vibrating-type driving unit 3. The bearing 35 and the follower roller 10 are supported by the roller shaft 11 which extends between the opposing end portions of arms 37 at a location above the driving head 7. The arms 37 are supported by a bearing 38 for pivotal movement with respect to the fixed portion 30. A torsion bar 39 is disposed coaxially to the pivot axis of the arms 37. A moment is imparted to the arms 37 by the torsion bar 39 and thus the follower roller 10 is pressed against the sheet material 1 (paper in this example) against the driving head 7. The bearing 35 is preferably constituted by a single-row ball bearing of the type which has a rotatable outer ring. Since the single-row ball bearing typically includes a slight positive clearance, smooth operation can be assured even if there is a slight alignment error between the vibrating-type driving unit 3 and the follower roller 10.

A contactless sensor 41 which is provided at the projecting end of a plate 40 which projects from the fixed portion 30 is located in the vicinity of the vibrating-type driving unit 3. A stopper 43 is supported by a mounting portion 42 provided in the upper portion of the arms 37. In addition, a gap enlarging mechanism 44 is provided between the fixed portion 30 and the arm 37.

When an A.C. voltage is applied across the electrostrictive device 32, the driving head 7 makes a fine elliptical motion. This elliptical motion is transmitted to the follower roller 10 through the paper 1. If the friction coefficient $\mu_2$ between the driving head 7 and the paper 1 is selected to be greater than the friction coefficient $\mu_1$ between the follower roller 10 and the paper 1, the follower roller 10 is driven in one direction and thus the paper 1 is conveyed in the direction indicated by an arrow, by the rotation of the follower roller 10.

Figure 11:
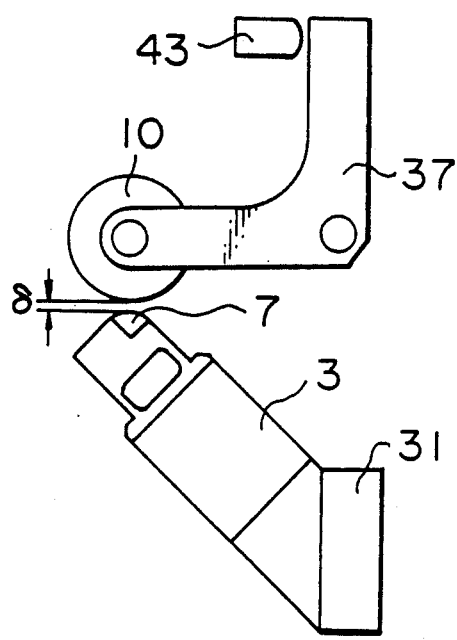
FIGS. 11 and 12 are views which serve to illustrate the state of operation of the stopper portion used in the embodiment of FIG. 10.
Figure 12:
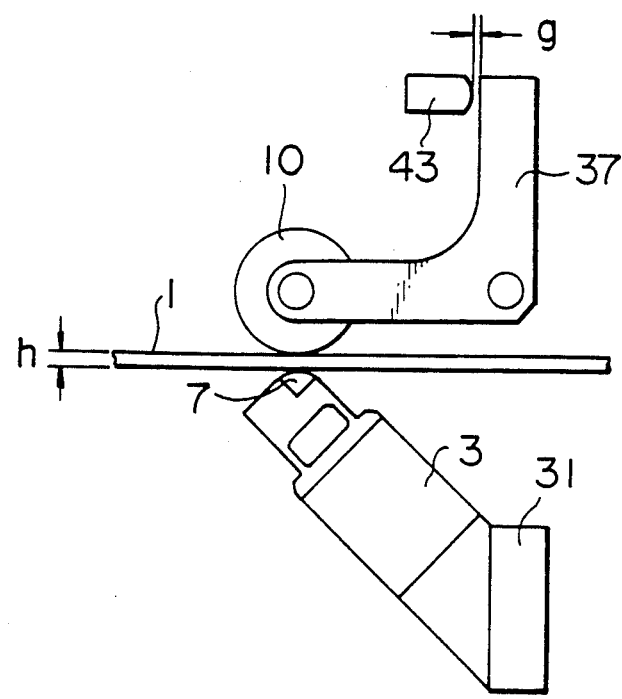

FIGS. 11 and 12 illustrate the principle of operation of the stopper 43. In FIG. 10, the same reference numbers are used to denote the same portions as those shown in FIG. 10. If the paper 1 is absent between the driving head 7 and the follower roller 10 (the state shown in FIG. 11), the upper portion of the arms 37 is kept in contact with the stopper 43 and a gap $\delta$ is resulted between the driving head 7 and the follower roller 3. Thus, even if the driving head 7 is vibrated due to the supply of electric power to the vibrating-type driving unit 3, the follower roller 10 is not directly driven.

Since the aforesaid gap $\delta$ is smaller than the thickness h of the paper 1, if the paper 1 is present between the driving head 7 and the follower roller 10 (the state shown in FIG. 12), the follower roller 10 is pushed upwardly and thus a gap $\delta$ is resulted between the stopper 43 and the upper portion of the arms 37. Accordingly, while the paper 1 is being conveyed, the stopper 43 does not exert any influence over the conveying mechanism. Since the paper 1 is pressed against the driving head 7 by the follower roller 10, the thickness h would be somewhat reduced. In this case, the gap $\delta$ may be selected to be smaller than the reduced thickness h.

In addition, the provision of the gap $\delta$ achieves an effect of facilitating insertion of the leading edge of the paper 1 between the driving head 7 and the follower roller 10.

Figure 13:
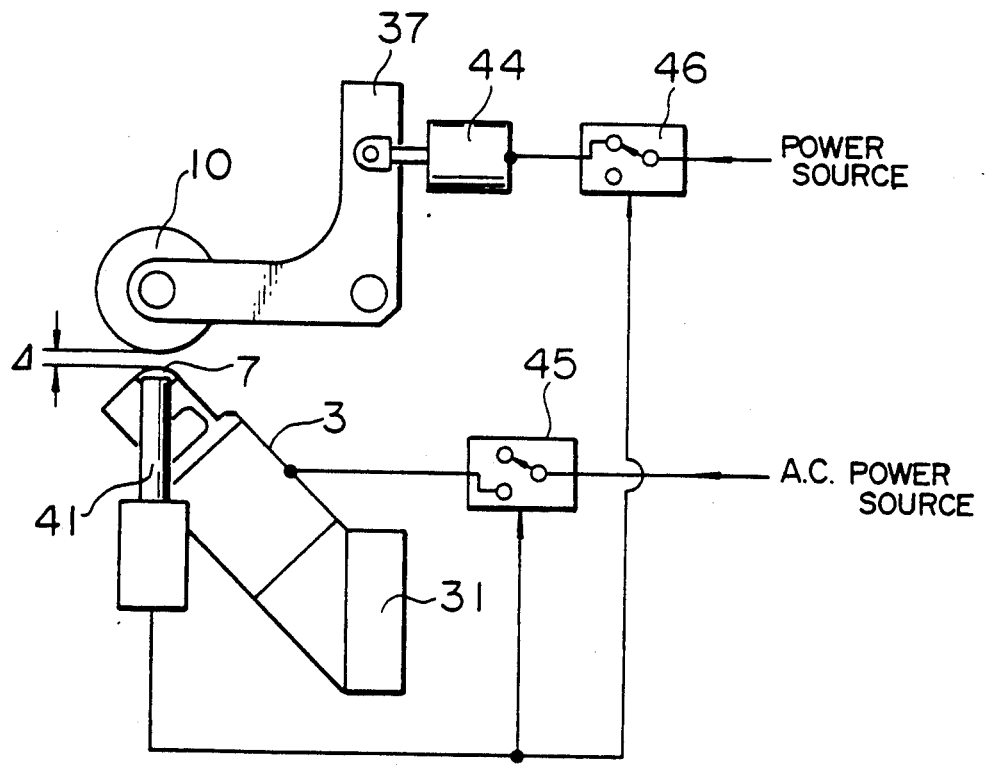
FIG. 13 is a view showing the driving circuit used in the embodiment of FIG. 10.

FIG. 13 shows the principle of operation of each of the contactless sensor 41 and the gap enlarging mechanism 44, and serves to illustrate a state wherein the paper 1 is absent between the driving head 7 and the follower roller 10. In FIG. 13, the same reference numerals are used to denote the same portions as those shown in FIG. 10. The output of the contactless sensor 41 is input to a relay 45 and a relay 46. The relay 45 serves to allow and cut off the supply of an A.C. voltage to the electrostrictive element 32, while the relay 46 serves to allow and cut off the supply of an A.C. voltage to the gap enlarging mechanism 44. The gap enlarging mechanism 44 may be constructed using, for example, a solenoid.

If the paper 1 is absent, the supply of an A.C. voltage to the electrostrictive device 32 is cut off by the relay 45, while an A.C. voltage is supplied to the gap enlarging mechanism 44 through the relay 46. In this state, the gap $\Delta$ between the driving head 7 and the follower roller 10 is greater than the thickness h of the paper 1.

When the paper 1 is inserted between the driving head 7 and the follower roller 10, the relays 45 and 46 are activated in response to a signal supplied from the contactless sensor 41, so that an A.C. voltage is supplied to the electrostrictive device 32, while the supply of the A.C. voltage to the gap enlarging mechanism 44 is cut off. Accordingly, the driving head 7 makes an elliptical motion at the same time that the paper 1 is pressed against the driving head 7 by the follower roller 10 and thus the conveyance of the paper 1 is started.

It is to be noted that, since the supply of the A.C. voltage to the electrostrictive device 32 is cut off by the relay 45 when the paper 1 is absent, generation of excessive heat in the electrostrictive device 32 is prevented. Accordingly, it is possible to reduce the power consumption of, and the amount of heat generated in, the conveying mechanism. Although, in the above-described embodiment, the contactless sensor 41 is disposed in the vicinity of the vibrating-type driving unit 3, it is apparent that similar effects can be achieved even if the contactless sensor 41 is disposed in the vicinity of the follower roller 10.

In the embodiment of the present invention which has been explained with reference to FIGS. 10 to 13, even if specific parts are omitted, it is occasionally possible to achieve effects similar to the abovedescribed ones. More specifically, the operation of setting the gap $\delta$ by means of the stopper 43, the operation of cutting off the supply of the A.C. voltage to the electrostrictive device 32 by means of the relay 45, and the operation of setting the gap $\Delta$ by means of the gap enlarging mechanism 44 are independent from one another. Accordingly, the parts which are associated with one or two of the three operations may be omitted. For example, if it is desired to simplify the mechanism, the plate 40, the contactless sensor 41, the gap enlarging mechanism 44, the relay 45 and the relay 46 may be omitted. In this case as well, since the gap $\delta$ is resulted between the driving head 7 and the follower roller 10 by the action of the stopper 34 as described above, the follower roller 10 is not directly driven by the driving head 7.

In the embodiment which is shown in FIGS. 10 to 13, the follower roller 10 is supported by the pivot mechanism constituted by the arms 37 and the bearing 38, and the torsion bar 39 applies a pressure to the follower roller 10. However, another form of mechanism may be applied applied to the sheet-material conveying mechanism employing a vibration in accordance with the present invention. For example, a leaf spring may be used in place of the arm 37, the bearing 38, and the torison bar 39, and the follower roller 10 may be supported by the leaf spring. In this arrangement, the leaf spring will perform the same function as the arm 37, the bearing 38 and the torsion bar 39. In the above-described embodiment, the gap enlarging mechanism 44 is constructed using a solenoid, but it is apparent that, even if another form of actuator such as an air cylinder is employed, similar effects can be achieved.

It will be appreciated from the foregoing that, in accordance with the present invention, it is possible to maintain stable conveyance over a long period.

What is claimed is:

1. An apparatus for conveying an object, comprising:
    a piezoelectric driving unit which generates a vibration having an amplitude on an order of several $\mu$m at an end surface of a driving head by application of an A.C. voltage;
    a rotating member arranged to be opposed to said driving head of said piezoelectric driving unit and supported for rotation about its axis in a direction in which said object is conveyed, wherein said rotating member has a surface such that a frictional coefficient $\mu_1$ between said driving head and said object and a frictional coefficient $\mu_2$ between said rotating member and said object satisfy a relationship of $\mu_1 < \mu_2$;
    pressure applying means for applying pressure to a portion of said object which is present in a gap between said piezoelectric driving unit and said rotating member when said object is being passed through said gap; and
    a power source for supplying electric power to said piezoelectric driving unit.

2. The apparatus according to claim 1 further including regulating means for regulating said A.C. voltage to be supplied to said piezoelectric driving unit.

3. An apparatus according to claim 1, further comprising:
    a plurality of said piezoelectric driving units arranged to receive electric power supplied from said power source and to generate a vibration when in contact with said object; and
    a plurality of said rotating members respectively disposed to come into contact with said plurality of piezoelectric driving units with said object sandwiched therebetween;
    wherein said plurality of piezoelectric driving units and said plurality of rotating members are disposed in a direction transverse to a direction in which said object is conveyed.

4. The apparatus according to claim 3, wherein a friction coefficient $\mu_2$ between said object and each of said plurality of rotating members is greater than a friction coefficient $\mu_1$ between each of said plurality of piezoelectric driving units and said object.

5. The apparatus according to claim 3, wherein said plurality of rotating members are connected by connecting means.

6. The apparatus according to claim 3, further including an electric-power regulating means for independently regulating the electric power supplied to each of said plurality of piezoelectric driving units which are opposed to said respective rotating members, said respective rotating members being capable of being independently rotated.

7. An apparatus according to claim 1, further comprising:
    a plurality of independently rotatable follower rollers disposed in a direction perpendicular to a direction in which said object is conveyed, wherein a piezoelectric driving unit is disposed in opposing relation to each of said plurality of rollers; and
an electric-power regulating means for independently regulating electric power to be supplied to each of said vibrating-type driving units;
wherein at least one of said driving head and one of said plurality of following rollers is selected so that a frictional force produced between said driving head and said object is smaller than a frictional force produced between said follower roller and said object.

8. An apparatus according to claim 1, further comprising:
a plurality of conveying units disposed in a direction of width of said object, each of said plurality of conveying units including a respective one of a plurality of said piezoelectric driving units which generates a vibration at a driving head thereof by having an AC voltage applied thereto and a respective one of a plurality of said rotating members disposed so as to be opposed to said driving head of said respective one of said plurality of piezoelectric driving units through said object;
skew detecting means for detecting an amount of skew at the opposite ends of said object in the direction of the width thereof and outputting a signal indicative thereof; and
electric-power regulating means responsive to said signal from said skew detecting means for regulating the supply of electric power to each of said plurality of conveying units so as to offset said amount of skew.

9. An apparatus according to claim 8, wherein said plurality of rotating members each comprise a roller.

10. An apparatus according to claim 1, wherein said rotating member comprises a roller.

11. An apparatus for conveying an object comprising:
a roller disposed for rotation about its axis in a direction of travel of said object to be conveyed;
a vibrating-type driving unit having a driving head disposed at a location opposing said roller;
object-presence detecting means for detecting whether or not said object is present in or near a gap between said roller and said driving head; and
relay means for cutting off supply of electric power to said vibrating-type driving unit for a period during which absence of said object is detected by said object-presence detecting means.

12. An apparatus for conveying an object, comprising:
a vibrating-type driving unit to generate a vibration at an end surface of a driving head by application of an A.C. voltage;
a roller arranged to be opposed to said driving head of said vibrating-type driving unit and supported for rotation about its axis in a direction in which said object is conveyed;
pressure applying means for applying to said object pressure large enough to enable said object to be conveyed by rotational force of said roller when said object is present between said roller and said vibrating-type driving unit;
speed detecting means for detecting speed of conveyance of said object; and
a driving circuit to calculate a difference between a desired speed and said speed of conveyance detected by said speed detecting means and then to regulate electric power to be supplied to said vibrating-type driving unit so as to offset said difference.

13. The apparatus according to claim 12, wherein said speed detecting means is a speed detector for detecting rotational speed of said roller.

14. An apparatus for conveying an object, comprising:
a vibrating-type driving unit;
a rotating member supported for rotation about its axis and cooperating with said vibrating-type driving unit to define a gap slightly smaller than thickness of said object;
a power source for supplying electric power to said vibrating-type driving unit;
position detecting means for detecting present position of said object to be conveyed; and
a controller for controlling supply of electric power to said vibrating-type driving unit in accordance with a difference between said present position and a desired position to which said object should be conveyed.

15. The apparatus according to claim 14, wherein said power source is capable of generating A.C. voltage and D.C. voltage, said controller controlling said power source to supply A.C. voltage to said vibrating-type driving unit until said difference reaches a predetermined small value and to supply D.C. voltage to said vibrating-type driving unit when said difference falls below said predetermined small value.

16. In a method of controlling a piezoelectric motor which is adapted to generate a circular locus in a piezoelectric driving unit incorporating a piezoelectric device to thereby drive a driven member brought into contact with said piezoelectric driving unit, a method of conveying an object characterized in that, in a case of long-stroke driving, rough driving is effected by utilizing vibration created by applying a high-frequency voltage across said piezoelectric device and in that, in a case of positioning, fine driving is effected by utilizing a small displacement created by applying D.C. voltage across said piezoelectric device, and in that, the timing for said positioning being set as a timing at which the value of a difference with respect to said desired position reaches a value not greater than any value which corresponds to the inside of the maximum stroke of a driving member on account of applying D.C. voltage across said piezoelectric device.

\* \* \* \* \*